United States Patent
Lee et al.

(10) Patent No.: US 7,602,851 B2
(45) Date of Patent: Oct. 13, 2009

(54) INTELLIGENT DIFFERENTIAL QUANTIZATION OF VIDEO CODING

(75) Inventors: Ming-Chieh Lee, Bellevue, WA (US); Bruce Chih-Lung Lin, Redmond, WA (US); Pohsiang Hsu, Redmond, WA (US); Thomas W. Holcomb, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 458 days.

(21) Appl. No.: 10/623,195

(22) Filed: Jul. 18, 2003

(65) Prior Publication Data

US 2005/0013500 A1  Jan. 20, 2005

(51) Int. Cl.
*H04N 7/12* (2006.01)

(52) U.S. Cl. ............ 375/240.25; 375/240; 375/240.01; 375/240.03; 375/240.16

(58) Field of Classification Search ............ 375/240.25, 375/240, 240.01, 240.12, 240.16, 240.03; 382/236, 243

See application file for complete search history.

(56) References Cited

U.S. PATENT DOCUMENTS

| | | | |
|---|---|---|---|
| 4,583,114 A | 4/1986 | Catros | |
| 4,679,079 A | 7/1987 | Catros et al. | |
| 4,774,574 A | 9/1988 | Daly et al. | |
| 4,862,264 A | 8/1989 | Wells et al. | |
| 4,965,830 A | 10/1990 | Barham et al. | |
| 4,992,889 A | 2/1991 | Yamagami et al. | |
| 5,072,295 A | 12/1991 | Murakami et al. | |
| 5,128,758 A | 7/1992 | Azadegan et al. | |
| 5,136,377 A | 8/1992 | Johnston et al. | |
| 5,179,442 A | 1/1993 | Azadegan et al. | |
| 5,237,410 A | 8/1993 | Inoue | |
| 5,241,395 A | 8/1993 | Chen | |
| 5,253,058 A | 10/1993 | Gharavi | |
| 5,301,242 A | 4/1994 | Gonzales et al. | |
| 5,303,058 A | 4/1994 | Fukuda et al. | |

(Continued)

FOREIGN PATENT DOCUMENTS

| | | |
|---|---|---|
| CA | 1327074 | 2/1994 |
| EP | 0932306 | 7/1999 |
| GB | 897363 | 5/1962 |
| JP | 2003061090 | 2/2003 |
| KR | 132895 | 10/1998 |

(Continued)

OTHER PUBLICATIONS

"H.264 & IPTV Over DSL—Enabling New Telco Revenue Opportunities," *White Paper*, Intel/Envivio, May 15, 2004, available at http://www.envivio.com/images/products/H264whitepaper.pdf.

(Continued)

*Primary Examiner*—Allen Wong
(74) *Attorney, Agent, or Firm*—Klarquist Sparkman, LLP

(57) ABSTRACT

With intelligent differential quantization, a video codec intelligently quantizes video at differing strength levels within a frame, such as on a macroblock (MB) or a group of MB basis. This allows the codec to control bit usage on a finer granularity than a frame to meet hardware constraints, as well as providing perceptual optimization by coarsely quantizing unimportant regions, while finely quantizing important regions within a frame. The intelligent differential quantization uses motion information gathered from encoding and analysis of the video to classify the importance of different regions of the image, and quantizes the regions accordingly. In addition, the intelligent differential quantization include efficient signaling of information as to the differential quantization strengths in the compressed bit stream.

14 Claims, 9 Drawing Sheets

U.S. PATENT DOCUMENTS

| | | |
|---|---|---|
| 5,317,396 A | 5/1994 | Fujinami |
| 5,317,672 A | 5/1994 | Crossman et al. |
| 5,374,958 A | 12/1994 | Yanagihara |
| 5,452,104 A | 9/1995 | Lee |
| 5,461,421 A | 10/1995 | Moon |
| 5,481,553 A | 1/1996 | Suzuki et al. |
| 5,559,557 A | 9/1996 | Kato |
| 5,565,920 A | 10/1996 | Lee et al. |
| 5,587,708 A | 12/1996 | Chiu |
| 5,606,371 A | 2/1997 | Gunnewiek et al. |
| 5,623,424 A | 4/1997 | Azadegan et al. |
| 5,631,644 A | 5/1997 | Katata et al. |
| 5,654,760 A | 8/1997 | Ohtsuki |
| 5,657,087 A * | 8/1997 | Jeong et al. ............ 375/240.16 |
| 5,663,763 A | 9/1997 | Yagasaki et al. |
| 5,731,836 A | 3/1998 | Lee |
| 5,731,837 A | 3/1998 | Hurst, Jr. |
| 5,739,861 A | 4/1998 | Music |
| 5,748,789 A * | 5/1998 | Lee et al. .................... 382/243 |
| 5,751,358 A | 5/1998 | Suzuki et al. |
| 5,751,379 A | 5/1998 | Markandey et al. |
| 5,761,088 A | 6/1998 | Hulyalkar et al. |
| 5,764,803 A * | 6/1998 | Jacquin et al. .............. 382/236 |
| 5,786,856 A | 7/1998 | Hall et al. |
| 5,802,213 A | 9/1998 | Gardos |
| 5,809,178 A | 9/1998 | Anderson et al. |
| 5,819,035 A | 10/1998 | Devaney et al. |
| 5,825,310 A | 10/1998 | Tsutsui |
| 5,835,145 A | 11/1998 | Ouyang et al. |
| 5,835,237 A | 11/1998 | Ebrahimi |
| 5,844,613 A | 12/1998 | Chaddha |
| 5,867,167 A | 2/1999 | Deering |
| 5,870,435 A | 2/1999 | Choi et al. |
| 5,883,672 A | 3/1999 | Suzuki et al. |
| 5,969,764 A | 10/1999 | Sun et al. |
| 5,970,173 A | 10/1999 | Lee et al. |
| 5,990,957 A | 11/1999 | Ryoo |
| 6,058,362 A | 5/2000 | Malvar |
| 6,072,831 A | 6/2000 | Chen |
| 6,084,636 A | 7/2000 | Fujiwara et al. |
| 6,088,392 A | 7/2000 | Rosenberg |
| 6,104,751 A * | 8/2000 | Artieri .................... 375/240.14 |
| 6,118,817 A | 9/2000 | Wang |
| 6,125,140 A | 9/2000 | Wilkinson |
| 6,148,107 A | 11/2000 | Ducloux et al. |
| 6,148,109 A | 11/2000 | Boon et al. |
| 6,160,846 A | 12/2000 | Chiang et al. |
| 6,167,091 A | 12/2000 | Okada et al. |
| 6,182,034 B1 | 1/2001 | Malvar |
| 6,212,232 B1 | 4/2001 | Reed et al. |
| 6,223,162 B1 | 4/2001 | Chen et al. |
| 6,240,380 B1 | 5/2001 | Malvar |
| 6,243,497 B1 | 6/2001 | Chiang et al. |
| 6,249,614 B1 | 6/2001 | Bocharova et al. |
| 6,256,422 B1 | 7/2001 | Mitchell et al. |
| 6,256,423 B1 | 7/2001 | Krishnamurthy |
| 6,263,024 B1 | 7/2001 | Matsumoto |
| 6,275,614 B1 | 8/2001 | Krishnamurthy et al. |
| 6,278,735 B1 | 8/2001 | Mohsenian |
| 6,292,588 B1 | 9/2001 | Shen et al. |
| 6,347,116 B1 | 2/2002 | Haskell et al. |
| 6,356,709 B1 | 3/2002 | Abe et al. |
| 6,370,502 B1 | 4/2002 | Wu et al. |
| 6,393,155 B1 | 5/2002 | Bright et al. |
| 6,418,166 B1 | 7/2002 | Wu et al. |
| 6,438,167 B1 * | 8/2002 | Shimizu et al. ......... 375/240.03 |
| 6,456,744 B1 | 9/2002 | Lafe |
| 6,473,534 B1 | 10/2002 | Merhav et al. |
| 6,490,319 B1 | 12/2002 | Yang |
| 6,493,385 B1 | 12/2002 | Sekiguchi et al. |
| 6,519,284 B1 | 2/2003 | Pesquet-Popescu et al. |
| 6,546,049 B1 | 4/2003 | Lee |
| 6,571,019 B1 | 5/2003 | Kim et al. |
| 6,593,925 B1 | 7/2003 | Hakura et al. |
| 6,647,152 B2 | 11/2003 | Willis et al. |
| 6,654,417 B1 | 11/2003 | Hui |
| 6,678,422 B1 | 1/2004 | Sharma et al. |
| 6,687,294 B2 | 2/2004 | Yan et al. |
| 6,704,718 B2 | 3/2004 | Burges et al. |
| 6,721,359 B1 | 4/2004 | Bist et al. |
| 6,728,317 B1 | 4/2004 | Demos |
| 6,738,423 B1 | 5/2004 | Lainema et al. |
| 6,759,999 B1 | 7/2004 | Doyen |
| 6,765,962 B1 | 7/2004 | Lee et al. |
| 6,771,830 B2 | 8/2004 | Goldstein et al. |
| 6,785,331 B1 | 8/2004 | Jozawa et al. |
| 6,792,157 B1 | 9/2004 | Koshi et al. |
| 6,795,584 B2 | 9/2004 | Karczewicz et al. |
| 6,801,572 B2 | 10/2004 | Yamada et al. |
| 6,810,083 B2 | 10/2004 | Chen et al. |
| 6,831,947 B2 | 12/2004 | Ribas Corbera |
| 6,873,654 B1 | 3/2005 | Rackett |
| 6,876,703 B2 | 4/2005 | Ismaeil et al. |
| 6,882,753 B2 | 4/2005 | Chen et al. |
| 6,947,045 B1 | 9/2005 | Ostermann et al. |
| 6,970,479 B2 | 11/2005 | Abrahamsson et al. |
| 6,990,242 B2 | 1/2006 | Malvar |
| 7,020,204 B2 | 3/2006 | Auvray et al. |
| 7,027,507 B2 | 4/2006 | Wu |
| 7,035,473 B1 | 4/2006 | Zeng et al. |
| 7,042,941 B1 | 5/2006 | Laksono et al. |
| 7,058,127 B2 | 6/2006 | Lu et al. |
| 7,099,389 B1 | 8/2006 | Yu et al. |
| 7,110,455 B2 | 9/2006 | Wu et al. |
| 2001/0048718 A1 | 12/2001 | Bruls et al. |
| 2002/0044602 A1 | 4/2002 | Ohki |
| 2002/0136308 A1 | 9/2002 | Le Maguet et al. |
| 2002/0154693 A1 | 10/2002 | Demos et al. |
| 2002/0186890 A1 | 12/2002 | Lee et al. |
| 2003/0021482 A1 | 1/2003 | Lan et al. |
| 2003/0113026 A1 | 6/2003 | Srinivasan et al. |
| 2003/0128754 A1 | 7/2003 | Akimoto et al. |
| 2003/0194010 A1 | 10/2003 | Srinivasan et al. |
| 2003/0215011 A1 | 11/2003 | Wang et al. |
| 2004/0022316 A1 | 2/2004 | Ueda et al. |
| 2004/0090397 A1 | 5/2004 | Doyen et al. |
| 2004/0264568 A1 | 12/2004 | Florencio |
| 2004/0264580 A1 | 12/2004 | Chiang Wei Yin et al. |
| 2005/0013365 A1 | 1/2005 | Mukerjee et al. |
| 2005/0013497 A1 | 1/2005 | Hsu et al. |
| 2005/0013498 A1 | 1/2005 | Srinivasan et al. |
| 2005/0015246 A1 | 1/2005 | Thumpudi et al. |
| 2005/0015259 A1 | 1/2005 | Thumpudi et al. |
| 2005/0036698 A1 | 2/2005 | Beom |
| 2005/0036699 A1 | 2/2005 | Holcomb et al. |
| 2005/0041738 A1 | 2/2005 | Lin et al. |
| 2005/0052294 A1 | 3/2005 | Liang et al. |
| 2005/0094731 A1 | 5/2005 | Xu et al. |
| 2005/0123274 A1 | 6/2005 | Crinon et al. |
| 2005/0135484 A1 | 6/2005 | Lee et al. |
| 2005/0147163 A1 | 7/2005 | Li et al. |
| 2005/0152451 A1 | 7/2005 | Byun |
| 2005/0180502 A1 | 8/2005 | Puri |
| 2005/0207492 A1 | 9/2005 | Pao |
| 2005/0232501 A1 | 10/2005 | Mukerjee |
| 2006/0013307 A1 | 1/2006 | Olivier et al. |
| 2006/0013309 A1 | 1/2006 | Ha et al. |
| 2006/0140267 A1 | 6/2006 | He et al. |

| | | |
|---|---|---|
| 2007/0009039 A1 | 1/2007 | Ryu |
| 2007/0009042 A1 | 1/2007 | Craig et al. |

FOREIGN PATENT DOCUMENTS

| | | |
|---|---|---|
| WO | WO 97/21302 | 6/1997 |
| WO | WO 0021207 | 4/2000 |
| WO | WO 02/07438 | 1/2002 |
| WO | WO 2004/100554 | 11/2004 |
| WO | WO 2004/100556 | 11/2004 |
| WO | WO 2005/065030 | 7/2005 |
| WO | WO 2006/075895 | 7/2006 |

OTHER PUBLICATIONS

H.W. Park and Y. L. Lee, "A post processing method for reducing quantization effects in low bit-rate moving picture coding," *IEEE Trans. Circuits Syst.*, Video Technol., vol. 9, pp. 161-171,-Feb. 1999.

D. J. LeGall, H. Gaggioni, and C. T. Chen, "Transmission of HDTV signals under 140 Mbits/s using a subband decomposition and Discrete Cosine Transform coding," in *Signal Processing of HDTV*; L. Chiariglione, Ed., pp. 287-293, Elsevier, Amsterdam, 1988.

D.J. LeGall, "MPEG: A Video Compression Standard for Multimedia Application," *Communications of the ACM*, vol. 34, No. 4, pp. 47-58, Apr. 1991.

D.J. LeGall, "The MPEG Video Compression Algorithm," *Signal Processing: Image Communication 4*, vol. 4, No. 2, pp. 129-140, Apr. 1992.

"ISO/IEC 11172-2. Coding of moving pictures and associated audio for digital storage media at up to about 1.5 Mbit/s," MPEG (Moving Pictures Expert Group), International Organization for Standardization, 1993. (MPEG1 Video).

"ISO/IEC 13818-2. Generic coding of moving pictures and associated audio information," MPEG (Moving Pictures Expert Group), International Organization for Standardization; 1994. (MPEG2 Video).

Video Coding for Low Bitrate Conununication, ITU-T Recommendation H.263, 1996.

M. Flierl, T. Wiegand, and B. Girod, "A Video Codec Incorporating Block-Based Multi-Hypothesis Motion-Compensated Prediction," in *Proceedings of the SPIE Conference on Visual Communications and Image Processing*, Perth, Australia, vol. 4067, pp. 238-249, Jun. 2000.

H.G. Musmann, P. Pirsch, and H.J. Grallert, "Advances in Picture Coding," *Proceedings of the IEEE*, vol. 73, No. 4, pp. 523-548, Apr. 1985.

S.-W. Wu and A. Gersho, "Joint Estimation of Forward and Backward Motion Vectors for Interpolative Prediction of Video," *IEEE Transactions on Image Processing*, vol. 3, No. 5, pp. 684-687, Sep. 1994.

X. Wu, N. Memon, "Context-based adaptive lossless codec," *IEEE Trans. Communications*, vol. 45, pp. 437-444, 1997.

N.Ahmed, T.Natrajan and K.R.Rao, "Discrete Cosine Transform," *IEEE Trans. on Computers*, vol. C-23, No. 1, pp. 90-93, Dec. 1984.

U.S. Appl. No. 10/846,140, filed May 15, 2004, Sullivan.

Atzori et al., "Adaptive Anisotropic Filtering (AAF) for Real-Time Visual Enhancement of MPEG-Coded Video Sequences," *IEEE Transactions on Circuits and Systems for Video Technology*, vol. 12, No. 5, pp. 285-298 (May 2002).

Bist et al., "Adaptive Quantization for Low Bit Rate Video Coding," *Proc. 1998 Int'l Conf. on Image Processing (ICIP 98)*, pp. 925-928 (1998).

Chen Shoushun et al., "Adaptive-Quantization Digital Image Sensor for Low-Power Image Compression," in *IEEE Transactions on Circuits and Systems —I: Regular Papers*, vol. 54, No. 1, pp. 13-25 (Jan. 2007).

Chisu, "Techniques for Accelerating Intensity-Based Rigid Image Registration," Thesis dated Jan. 15, 2005.

Clarke, "Image and Video Compression: A Survey," *Wiley InterScience Journal Abstract*, 2 pp., http://www.3.interscience.wiley.com [Downloaded from the World Wide Web on Jan. 25, 2006].

Diplom-Ingenieur et al., "Variable Block-Size Transforms for Hybrid Video Coding," Dissertation (2004).

"DivX Multi Standard Video Encoder," 2 pp. (Downloaded from the World Wide Web on Jan. 24, 2006).

Farvardin et al., "Optimum quantizer performance for a class of non-Gaussian memoryless sources," *IEEE Trans. Inform. Theory*, vol. IT-30, No. 3, pp. 485-497 (May 1984).

"A Fast Precise Implementation of 8x8 Discrete Cosine Transform Using the Streaming SIMD Extensions and MMX™ Instructions," Version 1.0, 25 pp. (Apr. 1999).

Flierl et al., "Generalized B Pictures and the Draft H.264/AVC Video Compression Standard," in *IEEE Transactions on Circuits and Systems for Video Technology*, vol. 13, No. 7, pp. 587-597 (Jul. 2003).

Foos et al., "JPEG 2000 compression of medical imagery," Proc. SPIE, vol. 3980, pp. 85-96 (2000).

Garrigues et al., "Atom position coding in a matching pursuit based video coder," *Lecture Notes in Computer Science*, 4 pp. (2005).

Gish et al., "Asymptotically efficient quantizing," *IEEE Trans. Inform. Theory*, vol. IT-14, No. 5 (Sep. 1968).

Golston et al., "Video codecs tutorial: Trade-offs with H.264, VC-1 and other advanced codecs," *Video/Imaging Design Line*, Mar. 2006, 9 pages.

Huang et al., "A Frame-Based MPEG Characteristics Extraction Tool and Its Application in Video Transcoding," *IEEE Transactions on Consumer Electronics*, vol. 48, No. 3, Aug. 2002, pp. 522-532.

ISO/IEC, "Information Technology—Coding of Audio-Visual Objects: Visual, ISO/IEC 14496-2, Committee Draft," 330 pp. (1998).

ITU-T, "ITU-T Recommendation H.261: Video Codec for Audiovisual Services at $p \times 64$ kbits," 28 pp. (1993).

ITU-T, "ITU-T Recommendation H.262: Information Technology—Generic Coding of Moving Pictures and Associated Audio Information: Video," 218 pp. (1995).

ITU-T, "ITU-T Recommendation H.263: Video Coding for Low Bit Rate Communication," 167 pp. (1998).

Joint Video Team (JVT) of ISO/IEC MPEG & ITU-T VCEG, "Draft ITU-T Recommendation and Final Draft International Standard of Joint Video Specification (ITU-T Rec. H.264 ISO/IEC 14496-10 AVC," 253 pp. (May 2003).

Joshi et al., "Comparison of generalized Gaussian and Laplacian modeling in DCT image coding," *IEEE Signal Proc. Letters*, vol. SPL-2, No. 5, pp. 81-82 (May 1995).

Kim et al., "Still image coding based on vector quantization and fractal approximation," *IEEE Transactions on Image Processing*, vol. 5, No. 4, pp. 587-597 (1996).

Lam et al., "A mathematical analysis of the DCT coefficient distributions for images," *IEEE Trans. Image Proc.*, vol. IP-9, No. 10, pp. 1661-1666 (Oct. 2000).

Limb, "A Picture-Coding Algorithm for the Merli Scan," *IEEE Transactions on Communications*, pp. 300-305 (Apr. 1973).

Lloyd, "Least squares quantization in PCM," *IEEE Trans. Inform. Theory*, vol. IT-28, No. 2; pp. 7-12 (Mar. 1982) (reprint of work originally presented in Jul. 1957).

Loomis, "Using the Advanced Settings of the Windows Media Video 9 Advanced Profile Codec," 14 pp. (Document dated Apr. 2006) [Downloaded from the World Wide Web on Jun. 22, 2007].

Lopresto et al., "Image Coding Based on Mixture Modeling of Wavelet Coefficients and a Fast Estimation-Quantization Framework," *Proc. IEEE Data Compression Conference*, (Snowbird, UT), pp. 221-230 (Mar. 1997).

Mallat, "A theory for multiresolution signal decomposition: the wavelet representation," *IEEE Trans. Pattern Anal. And Machine Intell.*, vol. PAMI-11, No. 7, pp. 674-692 (Jul. 1989).

Marshall, "The Discrete Cosine Transform," 4 pp. (document dated Oct. 4, 2001) [downloaded from the World Wide Web on Mar. 30, 2006].

Martinez-Fonte et al., "An Empirical Study on Corner Detection to Extract Buildings in Very High Resolution Satellite Images," *IEEE-ProRisc, Veldhoven, The Netherlands*, pp. 288-293 (Nov. 2004).

Masala et al., "Perceptually Optimized MPEG Compression of Synthetic Video Sequences," Proc. ICIP, pp. I-601 —I-604, *IEEE* (2005).

Max, "Quantizing for minimum distortion," *IEEE Trans. Inform. Theory*, vol. IT-6, No. 1, pp. 7-12 (Mar. 1960).

Microsoft Corporation, "Microsoft Debuts New Windows Media Player 9 Series, Redefining Digital Media on the PC," 4 pp. (Sep. 4, 2002) [Downloaded from the World Wide Web on May 14, 2004].

Mitra et al., "Two-Stage Color Palettization for Error Diffusion," *Proceedings of SPIE*, pp. 207-217 (Jun. 2002).

Mook, "Next-Gen Windows Media Player Leaks to the Web," *BetaNews*, 17 pp. (Jul. 19, 2002) [Downloaded from the World Wide Web on Aug. 8, 2003].

Muller, "Distribution shape of two-dimensional DCT coefficients of natural images," *IEE Electronics Letters*, vol. 29, No. 22 (Oct. 1993).

Murakami et al., "Comparison between DPCM and Hadamard transform coding in the composite coding of the NTSC color TV signal," *IEEE Trans. On Commun.*, vol. COM-30, No. 3, pp. 469-479 (Mar. 1982).

Neff et al., "Modulus Quantization for Matching Pursuit Video Coding," *IEEE Transactions on Circuits and Systems for Video Technology*, vol. 10, No. 6, pp. 895-912 (Sep. 2000).

Nguyen et al., "Set Theoretic Compression with an Application to Image Coding," *IEEE Transactions on Image Processing*, vol. 7, No. 7, pp. 1051-1056 (Jul. 1998).

Nougaret et al., "Quick Tuning of a Reference Locomotion Gait," IEEE Proc. Computer Animation '95, *IEEE*, 8 pp. (1995).

Puri et al., "Motion-Compensated Video Coding with Adaptive Perceptual Quantization," *IEEE Transactions on Circuits and Systems for Video Technology*, vol. 1, No. 4, pp. 351-361 (Dec. 1991).

Reininger et al., "Distribution of two-dimensional DCT coefficients for images," *IEEE Trans. On Commun.*, vol. COM-31, No. 6, pp. 835-839 (Jun. 1983).

Ribas Corbera et al., "Rate Control in DCT Video Coding for Low-Delay Communications," *IEEE Transactions on Circuits and Systems for Video Technology*, vol. 9, No. 1, pp. 172-185 (Feb. 1999).

Schuster et al., "A Theory for the Optimal Bit Allocation Between Displacement Vector Field and Displaced Frame Difference," *IEEE J. on Selected Areas in Comm.*, vol. 15, No. 9, pp. 1739-1751 (Dec. 1997).

Shanableh et al., "Heterogeneous Video Transcoding to Lower Spatio-Temporal Resolutions and Different Encoding Formats," *IEEE Transactions on Multimedia*, vol. 2, No. 2, Jun. 2000, pp. 101-110.

Shen et al., "Rate-Distortion Optimization for Fast Hierarchical B-Picture Transcoding," *IEEE*, 2006, pp. 5279-5282.

Sony Electronics Inc., "Sony Vizaro DVD Encoder System DVA-V700," 4 pp. (2001).

Sullivan, "Efficient scalar quantization of exponential and Laplacian random variables," *IEEE Trans. Inform. Theory*, vol. IT-42, No. 5, pp. 1365-1374 (Sep. 1996).

Sullivan et al., "Rate-Distortion Optimization for Video Compression," *IEEE Signal Processing Magazine*, pp. 74-90 (Nov. 1998).

Sullivan et al., "The H.264/AVC Advanced Video Coding Standard: Overview and Introduction to the Fidelity Range Extensions," 21 pp. (Aug. 2004).

Tao et al., "Adaptive Model-driven Bit Allocation for MPEG Video Coding," *IEEE Transactions on Circuits and Systems for Video Tech.*, vol. 10, No. 1, pp. 147-157 (Feb. 2000).

Tescher, "Transform image coding," *Advances in Electronics and Electron. Physics*, Suppl. 12, Academic Press, New York, pp. 113-115 (1979).

Tsang et al., "Fuzzy Based Rate Control for Real-Time MPEG Video," *IEEE Transactions on Fuzzy Systems*, pp. 504-516 (1998).

"Video Coding for Low Bitrate Communication," ITU-T Recommendation H.263 (1996).

Wien, "Variable Block-Size Transforms for Hybrid Video Coding," Dissertation, 182 pp. (Feb. 2004).

Yang et al., "Rate Control for Videophone Using Local Perceptual Cues," *IEEE Transactions on Circuits and Systems for Video Tech.*, vol. 15, No. 4, pp. 496-507 (Apr. 2005).

Yuen et al., "A survey of hybrid MC/DPCM/DCT video coding distortions," *Signal Processing*, vol. 70, pp. 247-278 (1998).

Zhang et al., "Adaptive Field/Frame Selection for High Compression Coding," *SPIE Conf. on Image and Video Communications and Processing*, Jan. 2003, 13 pages.

Impoco, "JPEG2000 —a Short Tutorial," 16 pp. (2004).

ISO/IEC, "10918-1: CCITT Recommendation T.81: Digital Compression and Coding of Continuous Tone Still Images," pp. 337-547 (1992).

ITU-T, "ITU-T Recommendation T.800: JPEG 2000 Image Coding System: Core Coding System," 212 pp. (2002).

Kingsbury, "Use of Laplacian PDFs in Image Compression," 5 pp. (2003).

Marcellin et al., "An Overview of JPEG-2000," IEEE Data Compression Conference, 19 pp. (2000).

Santa Cruz et al., "An Analytical Study of JPEG 2000 Functionalities"/"JPEG 2000 Still Image Coding Versus Other Standards," Proc. SPIE vol. 4115, 10 pp. (2000).

Taubman et al., "JPEG2000: Image Compression Fundamentals, Standards and Practice," pp. 110-113 and 348-353 (2002).

Taubman et al., "Embedded Block Coding in JPEG2000," 4 pp. (2000).

\* cited by examiner

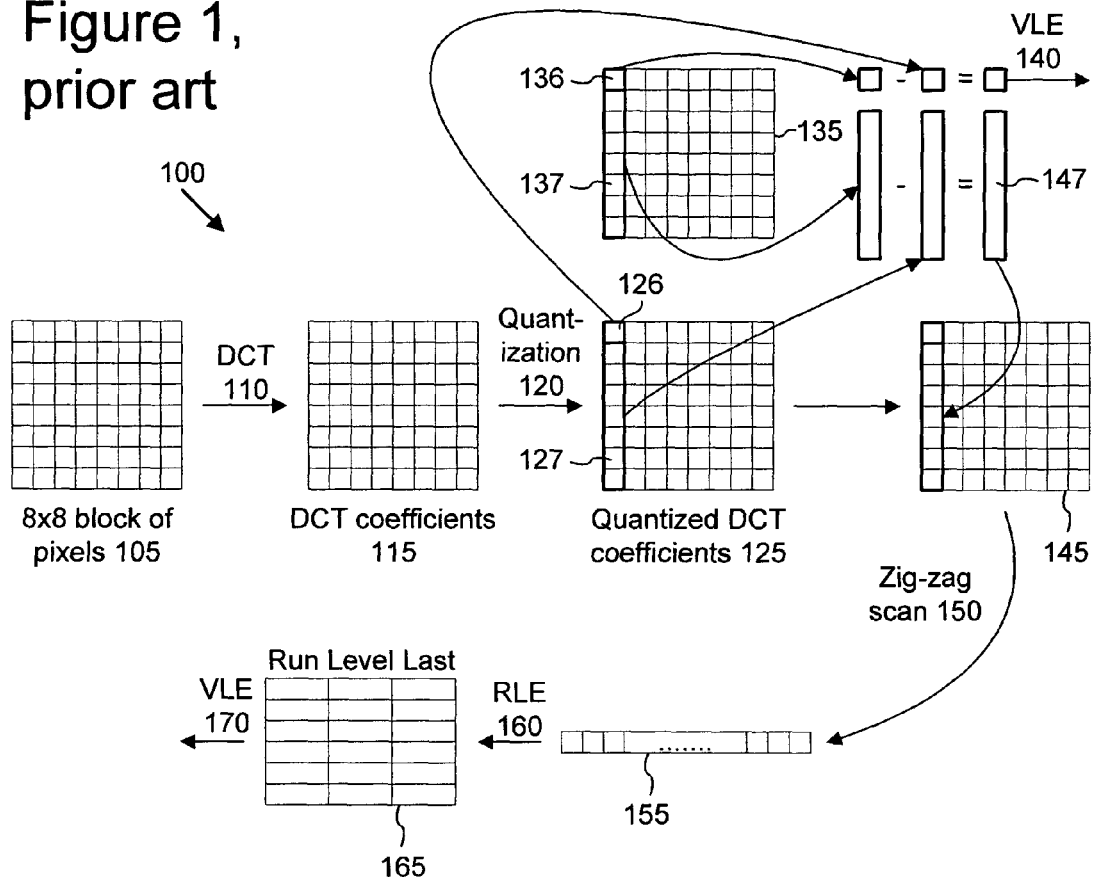
Figure 1, prior art
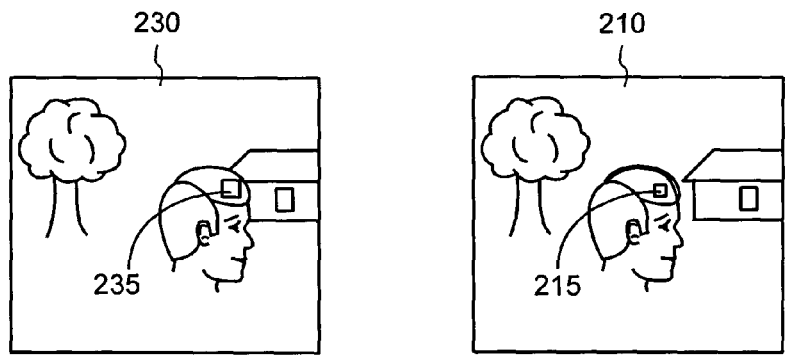
Figure 2, prior art

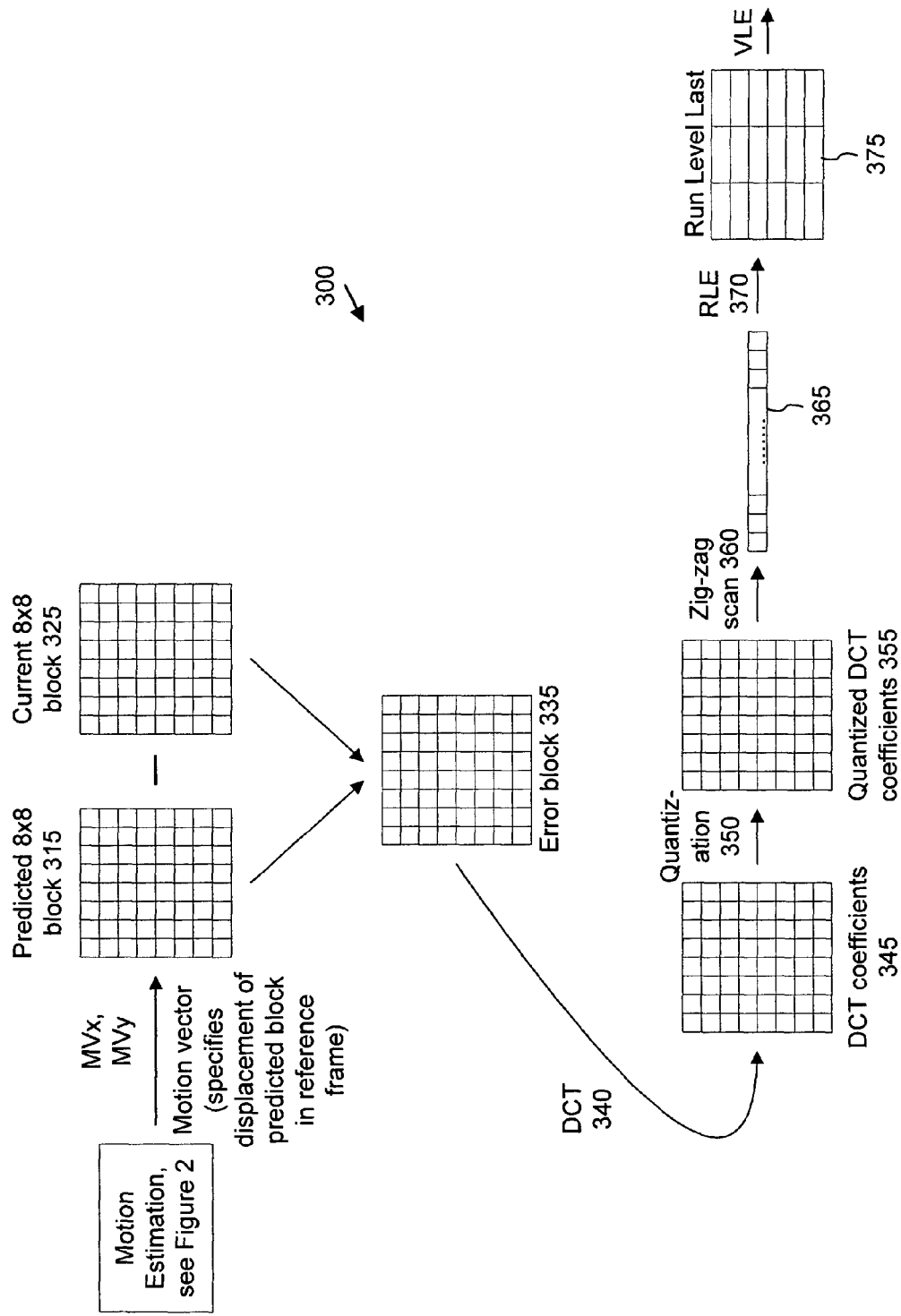
Figure 3, prior art

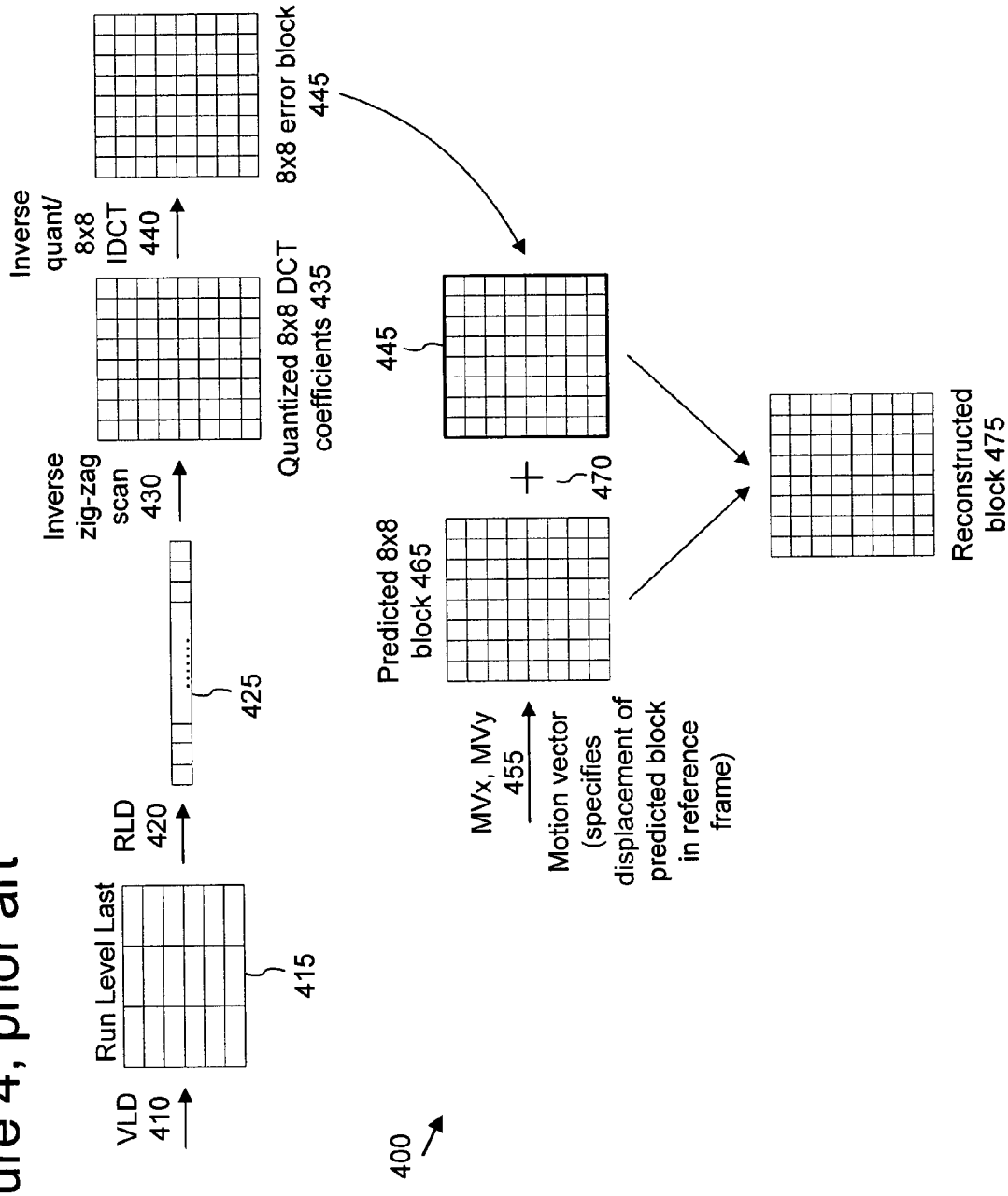
Figure 4, prior art

Figure 5, prior art
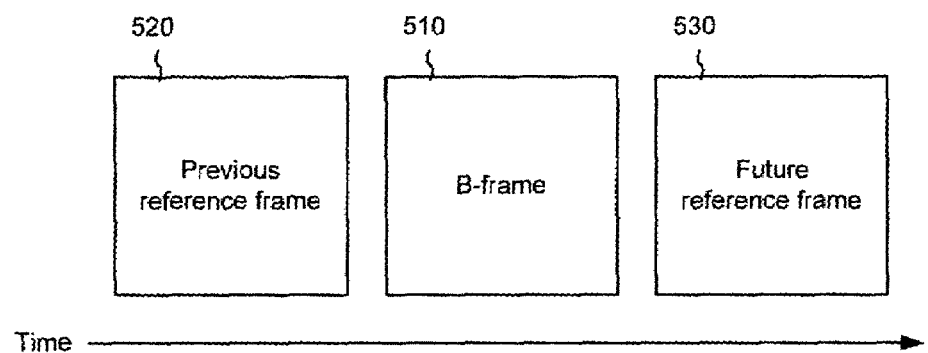
Figure 6, prior art
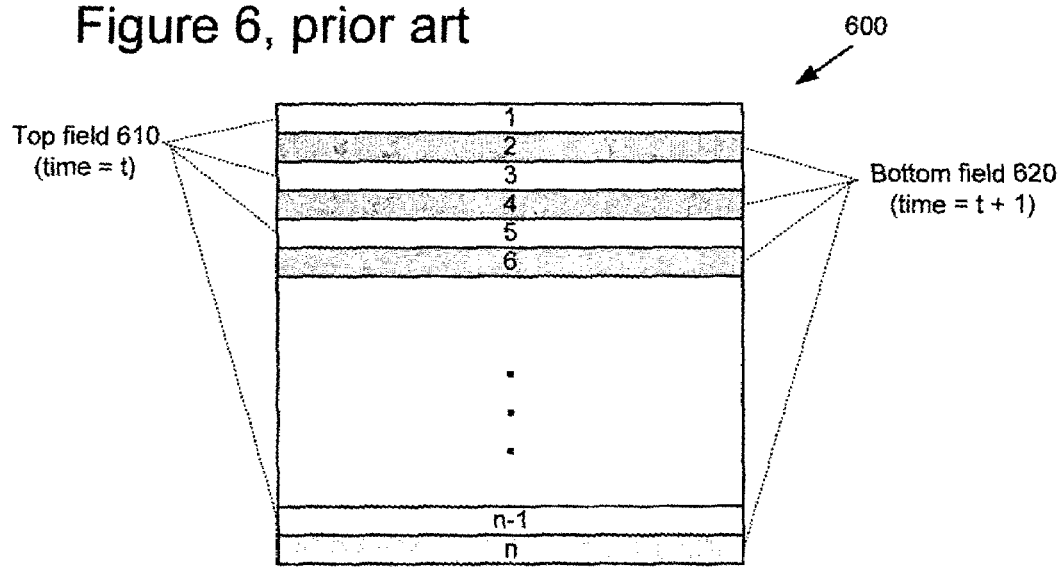

Software 780 implementing video encoder or decoder

INTELLIGENT DIFFERENTIAL QUANTIZATION OF VIDEO CODING

RELATED APPLICATION INFORMATION

The following co-pending U.S. patent applications relate to the present application and are hereby incorporated herein by reference: 1) U.S. patent application Ser. No. 10/622,378 entitled, "Advanced Bi-Directional Predictive Coding of Video Frames," filed concurrently herewith; 2) U.S. patent application Ser. No. 10/622,284, entitled, "Intraframe and Interframe Interlace Coding and Decoding," filed concurrently herewith; 3) U.S. patent application Ser. No. 10/622,841 entitled, "Coding of Motion Vector Information," filed concurrently herewith; 4) U.S. patent application Ser. No. 10/321,415, entitled, "Skip Macroblock Coding," filed Dec. 16, 2002; and 5) U.S. patent application Ser. No. 10/379,615, entitled "Chrominance Motion Vector Rounding," filed Mar. 4, 2003.

COPYRIGHT AUTHORIZATION

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

TECHNICAL FIELD

The invention relates generally to differential quantization in digital video coding or compression.

BACKGROUND

Digital video consumes large amounts of storage and transmission capacity. A typical raw digital video sequence includes 15 or 30 frames per second. Each frame can include tens or hundreds of thousands of pixels (also called pels). Each pixel represents a tiny element of the picture. In raw form, a computer commonly represents a pixel with 24 bits. Thus, the number of bits per second, or bit rate, of a typical raw digital video sequence can be 5 million bits/second or more.

Most computers and computer networks lack the resources to process raw digital video. For this reason, engineers use compression (also called coding or encoding) to reduce the bit rate of digital video. Compression can be lossless, in which quality of the video does not suffer but decreases in bit rate are limited by the complexity of the video. Or, compression can be lossy, in which quality of the video suffers but decreases in bit rate are more dramatic. Decompression reverses compression.

In general, video compression techniques include intraframe compression and interframe compression. Intraframe compression techniques compress individual frames, typically called I-frames or key frames. Interframe compression techniques compress frames with reference to preceding and/or following frames, which are typically called predicted frames, P-frames, or B-frames.

Microsoft Corporation's Windows Media Video, Version 8 ["WMV8"] includes a video encoder and a video decoder. The WMV8 encoder uses intraframe and interframe compression, and the WMV8 decoder uses intraframe and interframe decompression.

A. Intraframe Compression in WMV8

FIG. 1 illustrates block-based intraframe compression 100 of a block 105 of pixels in a key frame in the WMV8 encoder. A block is a set of pixels, for example, an 8×8 arrangement of pixels. The WMV8 encoder splits a key video frame into 8×8 blocks of pixels and applies an 8×8 Discrete Cosine Transform ["DCT"] 110 to individual blocks such as the block 105. A DCT is a type of frequency transform that converts the 8×8 block of pixels (spatial information) into an 8×8 block of DCT coefficients 115, which are frequency information. The DCT operation itself is lossless or nearly lossless. Compared to the original pixel values, however, the DCT coefficients are more efficient for the encoder to compress since most of the significant information is concentrated in low frequency coefficients (conventionally, the upper left of the block 115) and many of the high frequency coefficients (conventionally, the lower right of the block 115) have values of zero or close to zero.

The encoder then quantizes 120 the DCT coefficients, resulting in an 8×8 block of quantized DCT coefficients 125. For example, the encoder applies a uniform, scalar quantization step size to each coefficient. Quantization is lossy. Since low frequency DCT coefficients tend to have higher values, quantization results in loss of precision but not complete loss of the information for the coefficients. On the other hand, since high frequency DCT coefficients tend to have values of zero or close to zero, quantization of the high frequency coefficients typically results in contiguous regions of zero values. In addition, in some cases high frequency DCT coefficients are quantized more coarsely than low frequency DCT coefficients, resulting in greater loss of precision/information for the high frequency DCT coefficients.

The encoder then prepares the 8×8 block of quantized DCT coefficients 125 for entropy encoding, which is a form of lossless compression. The exact type of entropy encoding can vary depending on whether a coefficient is a DC coefficient (lowest frequency), an AC coefficient (other frequencies) in the top row or left column, or another AC coefficient.

The encoder encodes the DC coefficient 126 as a differential from the DC coefficient 136 of a neighboring 8×8 block, which is a previously encoded neighbor (e.g., top or left) of the block being encoded. (FIG. 1 shows a neighbor block 135 that is situated to the left of the block being encoded in the frame.) The encoder entropy encodes 140 the differential.

The entropy encoder can encode the left column or top row of AC coefficients as a differential from a corresponding column or row of the neighboring 8×8 block. FIG. 1 shows the left column 127 of AC coefficients encoded as a differential 147 from the left column 137 of the neighboring (to the left) block 135. The differential coding increases the chance that the differential coefficients have zero values. The remaining AC coefficients are from the block 125 of quantized DCT coefficients.

The encoder scans 150 the 8×8 block 145 of predicted, quantized AC DCT coefficients into a one-dimensional array 155 and then entropy encodes the scanned AC coefficients using a variation of run length coding 160. The encoder selects an entropy code from one or more run/level/last tables 165 and outputs the entropy code.

B. Interframe Compression in WMV8

Interframe compression in the WMV8 encoder uses block-based motion compensated prediction coding followed by transform coding of the residual error. FIGS. 2 and 3 illustrate the block-based interframe compression for a predicted frame in the WMV8 encoder. In particular, FIG. 2 illustrates motion estimation for a predicted frame 210 and FIG. 3 illustrates compression of a prediction residual for a motion-estimated block of a predicted frame.

For example, the WMV8 encoder splits a predicted frame into 8×8 blocks of pixels. Groups of four 8×8 blocks form macroblocks. For each macroblock, a motion estimation process is performed. The motion estimation approximates the motion of the macroblock of pixels relative to a reference frame, for example, a previously coded, preceding frame. In FIG. 2, the WMV8 encoder computes a motion vector for a macroblock 215 in the predicted frame 210. To compute the motion vector, the encoder searches in a search area 235 of a reference frame 230. Within the search area 235, the encoder compares the macroblock 215 from the predicted frame 210 to various candidate macroblocks in order to find a candidate macroblock that is a good match. After the encoder finds a good matching macroblock, the encoder outputs information specifying the motion vector (entropy coded) for the matching macroblock so the decoder can find the matching macroblock during decoding. When decoding the predicted frame 210 with motion compensation, a decoder uses the motion vector to compute a prediction macroblock for the macroblock 215 using information from the reference frame 230. The prediction for the macroblock 215 is rarely perfect, so the encoder usually encodes 8×8 blocks of pixel differences (also called the error or residual blocks) between the prediction macroblock and the macroblock 215 itself.

FIG. 3 illustrates an example of computation and encoding of an error block 335 in the WMV8 encoder. The error block 335 is the difference between the predicted block 315 and the original current block 325. The encoder applies a DCT 340 to the error block 335, resulting in an 8×8 block 345 of coefficients. The encoder then quantizes 350 the DCT coefficients, resulting in an 8×8 block of quantized DCT coefficients 355. The quantization step size is adjustable. Quantization results in loss of precision, but not complete loss of the information for the coefficients.

The encoder then prepares the 8×8 block 355 of quantized DCT coefficients for entropy encoding. The encoder scans 360 the 8×8 block 355 into a one dimensional array 365 with 64 elements, such that coefficients are generally ordered from lowest frequency to highest frequency, which typically creates long runs of zero values.

The encoder entropy encodes the scanned coefficients using a variation of run length coding 370. The encoder selects an entropy code from one or more run/level/last tables 375 and outputs the entropy code.

FIG. 4 shows an example of a corresponding decoding process 400 for an inter-coded block. Due to the quantization of the DCT coefficients, the reconstructed block 475 is not identical to the corresponding original block. The compression is lossy.

In summary of FIG. 4, a decoder decodes (410, 420) entropy-coded information representing a prediction residual using variable length decoding 410 with one or more run/level/last tables 415 and run length decoding 420. The decoder inverse scans 430 a one-dimensional array 425 storing the entropy-decoded information into a two-dimensional block 435. The decoder inverse quantizes and inverse discrete cosine transforms (together, 440) the data, resulting in a reconstructed error block 445. In a separate motion compensation path, the decoder computes a predicted block 465 using motion vector information 455 for displacement from a reference frame. The decoder combines 470 the predicted block 465 with the reconstructed error block 445 to form the reconstructed block 475.

The amount of change between the original and reconstructed frame is termed the distortion and the number of bits required to code the frame is termed the rate for the frame. The amount of distortion is roughly inversely proportional to the rate. In other words, coding a frame with fewer bits (greater compression) will result in greater distortion, and vice versa.

C. Bi-directional Prediction

Bi-directionally coded images (e.g., B-frames) use two images from the source video as reference (or anchor) images. For example, referring to FIG. 5, a B-frame 510 in a video sequence has a temporally previous reference frame 520 and a temporally future reference frame 530.

Some conventional encoders use five prediction modes (forward, backward, direct, interpolated and intra) to predict regions in a current B-frame. In intra mode, an encoder does not predict a macroblock from either reference image, and therefore calculates no motion vectors for the macroblock. In forward and backward modes, an encoder predicts a macroblock using either the previous or future reference frame, and therefore calculates one motion vector for the macroblock. In direct and interpolated modes, an encoder predicts a macroblock in a current frame using both reference frames. In interpolated mode, the encoder explicitly calculates two motion vectors for the macroblock. In direct mode, the encoder derives implied motion vectors by scaling the co-located motion vector in the future reference frame, and therefore does not explicitly calculate any motion vectors for the macroblock.

D. Interlace Coding

A typical interlaced video frame consists of two fields scanned at different times. For example, referring to FIG. 6, an interlaced video frame 600 includes top field 610 and bottom field 620. Typically, the odd-numbered lines (top field) are scanned at one time (e.g., time t) and the even-numbered lines (bottom field) are scanned at a different (typically later) time (e.g., time t+1). This arrangement can create jagged tooth-like features in regions of a frame where motion is present because the two fields are scanned at different times. On the other hand, in stationary regions, image structures in the frame may be preserved (i.e., the interlace artifacts visible in motion regions may not be visible in stationary regions).

E. Standards for Video Compression and Decompression

Aside from WMV8, several international standards relate to video compression and decompression. These standards include the Motion Picture Experts Group ["MPEG"] 1, 2, and 4 standards and the H.261, H.262, and H.263 standards from the International Telecommunication Union ["ITU"]. Like WMV8, these standards use a combination of intraframe and interframe compression. The MPEG 4 standard describes coding of macroblocks in 4:2:0 format using, for example, frame DCT coding, where each luminance block is composed of lines from two fields alternately, and field DCT coding, where each luminance block is composed of lines from only one of two fields.

F. Differential Quantization

Differential quantization is a technique in which the amount of quantization applied to various blocks within a single video frame can vary. Differential quantization has been adopted or used in various standards. The key benefit is to control bit rate at finer resolution to meet hardware requirements. One common problem that occurs when it is used is that the visual quality is compromised, especially when it is used in low bit rate encoding. For example, signaling quantization parameters individually per each block in a frame of video can consume a significant number of bits in the compressed bitstream, which bits could otherwise be used to encode better quality video.

Given the critical importance of video compression and decompression to digital video, it is not surprising that video compression and decompression are richly developed fields. Whatever the benefits of previous video compression and decompression techniques, however, they do not have the advantages of the following techniques and tools.

SUMMARY

A video compression encoder/decoder (codec) described herein includes techniques for intelligent differential quantization. With these techniques, video can be intelligently quantized at differing strength levels within a frame, such as on a macroblock (MB) or a group of MB basis. The key benefits of intelligent differential quantization are the abilities to control bit usage on a finer granularity than a frame to meet hardware constraints (e.g., in a CD player, DVD player, etc.). In addition, the intelligent differential quantization allows perceptual optimization by coarsely quantizing unimportant regions, while finely quantizing important regions within a frame.

The intelligent differential quantization techniques are particularly beneficial in consumer devices that have a fixed reading/writing speed requirement, and can not handle a sudden burst of data. By allowing the codec to control the amount of data generated on a finer scale, manufacturers will be able to build consumer devices that can more readily handle the compressed bitstream. In addition, intelligent differential quantization helps to improve the perceptual quality of the video.

The intelligent differential quantization techniques described herein address this quality loss issue. The techniques use the information gathered from encoding and analysis of the video to classify the importance of different regions of the image and quantize them accordingly. In addition, the techniques include an efficient way to signal all the necessary information of the differential quantization strengths in the compressed bit stream.

Additional features and advantages of the invention will be made apparent from the following detailed description of embodiments that proceeds with reference to the accompanying drawings.

BRIEF DESCRIPTION OF THE DRAWINGS

FIG. 1 is a diagram showing block-based intraframe compression of an 8×8 block of pixels according to the prior art.

FIG. 2 is a diagram showing motion estimation in a video encoder according to the prior art.

FIG. 3 is a diagram showing block-based interframe compression for an 8×8 block of prediction residuals in a video encoder according to the prior art.

FIG. 4 is a diagram showing block-based interframe decompression for an 8×8 block of prediction residuals in a video encoder according to the prior art.

FIG. 5 is a diagram showing a B-frame with past and future reference frames according to the prior art.

FIG. 6 is a diagram showing an interlaced video frame according to the prior art.

DETAILED DESCRIPTION

Figure 7:
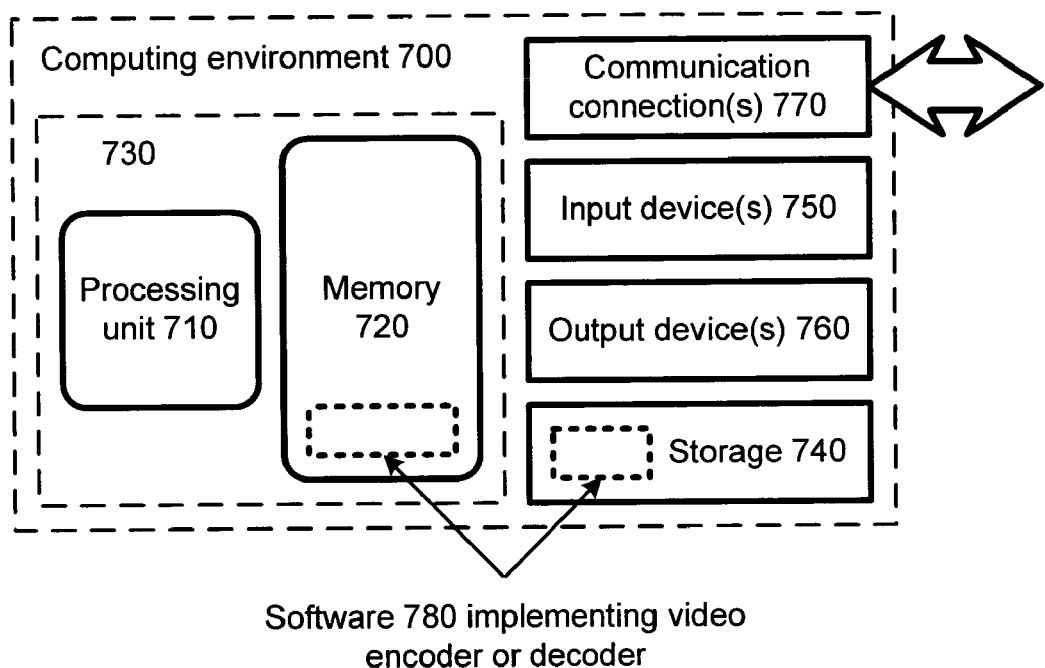
FIG. 7 is a block diagram of a suitable computing environment in which several described embodiments may be implemented.
Figure 8:
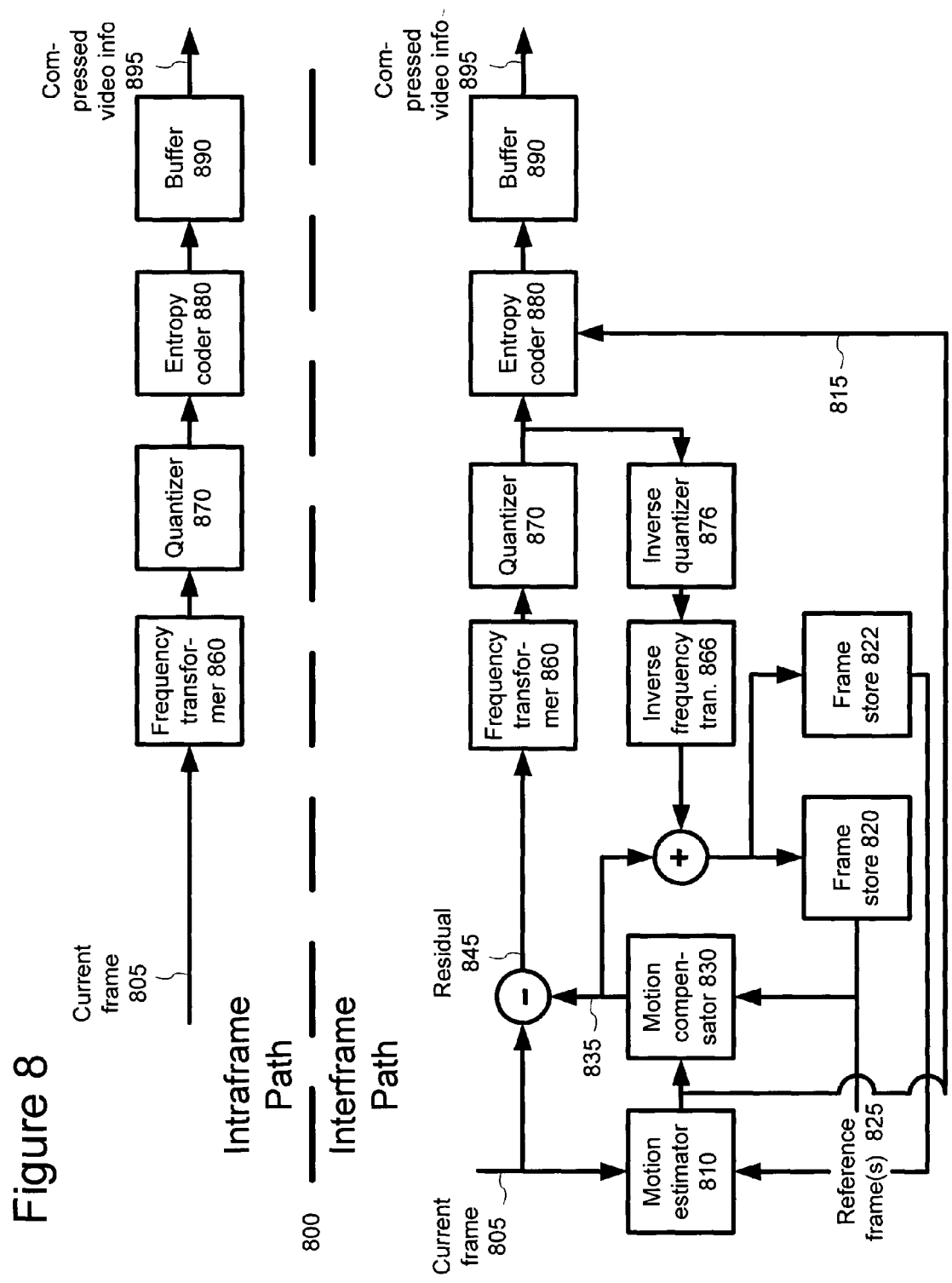
FIG. 8 is a block diagram of a generalized video encoder system used in several described embodiments.
Figure 9:
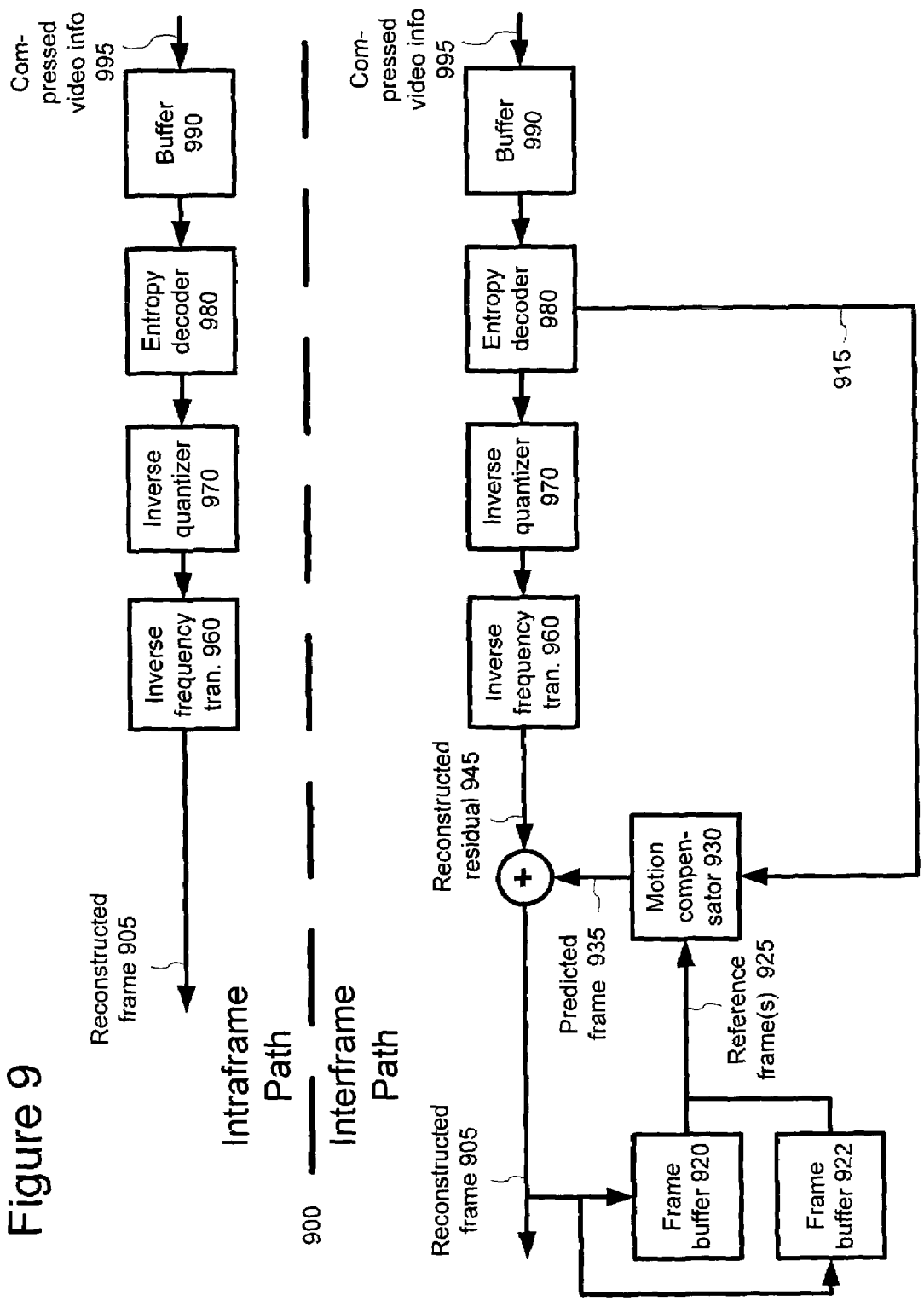
FIG. 9 is a block diagram of a generalized video decoder system used in several described embodiments.

For purposes of illustration, the innovations summarized above are incorporated into embodiments of a video encoder and decoder (codec) illustrated in FIGS. 8-9, which in one embodiment implements a version of the Windows Media Video codec standard (e.g., the current version 9 of this standard). In alternative embodiments, the innovations described herein can be implemented independently or in combination in the context of other digital signal compression systems, and other video codec standards. In general, the depicted video encoder and decoder incorporating the techniques can be implemented in a computing device, such as illustrated in FIG. 7. Additionally, the video encoder and decoder incorporating the techniques can be implemented in dedicated or programmable digital signal processing hardware in other digital signal processing devices.

I. Computing Environment

FIG. 7 illustrates a generalized example of a suitable computing environment 700 in which several of the described embodiments may be implemented. The computing environment 700 is not intended to suggest any limitation as to scope of use or functionality, as the techniques and tools may be implemented in diverse general-purpose or special-purpose computing environments.

With reference to FIG. 7, the computing environment 700 includes at least one processing unit 710 and memory 720. In FIG. 7, this most basic configuration 730 is included within a dashed line. The processing unit 710 executes computer-executable instructions and may be a real or a virtual processor. In a multi-processing system, multiple processing units execute computer-executable instructions to increase processing power. The memory 720 may be volatile memory (e.g., registers, cache, RAM), non-volatile memory (e.g., ROM, EEPROM, flash memory, etc.), or some combination of the two. The memory 720 stores software 780 implementing a video encoder or decoder.

A computing environment may have additional features. For example, the computing environment 700 includes storage 740, one or more input devices 750, one or more output devices 760, and one or more communication connections 770. An interconnection mechanism (not shown) such as a bus, controller, or network interconnects the components of the computing environment 700. Typically, operating system software (not shown) provides an operating environment for other software executing in the computing environment 700, and coordinates activities of the components of the computing environment 700.

The storage 740 may be removable or non-removable, and includes magnetic disks, magnetic tapes or cassettes, CD-ROMs, DVDs, or any other medium which can be used to store information and which can be accessed within the computing environment 700. The storage 740 stores instructions for the software 780 implementing the video encoder or decoder.

The input device(s) 750 may be a touch input device such as a keyboard, mouse, pen, or trackball, a voice input device, a scanning device, or another device that provides input to the computing environment 700. For audio or video encoding, the input device(s) 750 may be a sound card, video card, TV tuner card, or similar device that accepts audio or video input in analog or digital form, or a CD-ROM or CD-RW that reads audio or video samples into the computing environment 700. The output device(s) 760 may be a display, printer, speaker, CD-writer, or another device that provides output from the computing environment 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment 700, computer-readable media include memory 720, storage 740, communication media, and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "indicate," "choose," "obtain," and "apply" to describe computer operations in a computing environment. These terms are high-level abstractions for operations performed by a computer, and should not be confused with acts performed by a human being. The actual computer operations corresponding to these terms vary depending on implementation.

II. Generalized Video Encoder and Decoder

FIG. 8 is a block diagram of a generalized video encoder 800 and FIG. 9 is a block diagram of a generalized video decoder 900.

The relationships shown between modules within the encoder and decoder indicate the main flow of information in the encoder and decoder; other relationships are not shown for the sake of simplicity. In particular, FIGS. 8 and 9 generally do not show side information indicating the encoder settings, modes, tables, etc. used for a video sequence, frame, macroblock, block, etc. Such side information is sent in the output bit stream, typically after entropy encoding of the side information. The format of the output bit stream can be a Windows Media Video format or another format.

The encoder 800 and decoder 900 are block-based and use a 4:1:1 macroblock format. Each macroblock includes four 8×8 luminance blocks and four 4×8 chrominance blocks. Further details regarding the 4:1:1 format are provided below. The encoder 800 and decoder 900 also can use a 4:2:0 macroblock format with each macroblock including four 8×8 luminance blocks (at times treated as one 16×16 macroblock) and two 8×8 chrominance blocks. Alternatively, the encoder 800 and decoder 900 are object-based, use a different macroblock or block format, or perform operations on sets of pixels of different size or configuration.

Depending on implementation and the type of compression desired, modules of the encoder or decoder can be added, omitted, split into multiple modules, combined with other modules, and/or replaced with like modules. In alternative embodiments, encoder or decoders with different modules and/or other configurations of modules perform one or more of the described techniques.

A. Video Encoder

FIG. 8 is a block diagram of a general video encoder system 800. The encoder system 800 receives a sequence of video frames including a current frame 805, and produces compressed video information 895 as output. Particular embodiments of video encoders typically use a variation or supplemented version of the generalized encoder 800.

The encoder system 800 compresses predicted frames and key frames. For the sake of presentation, FIG. 8 shows a path for key frames through the encoder system 800 and a path for predicted frames. Many of the components of the encoder system 800 are used for compressing both key frames and predicted frames. The exact operations performed by those components can vary depending on the type of information being compressed.

A predicted frame (also called P-frame, B-frame, or inter-coded frame) is represented in terms of prediction (or difference) from one or more reference (or anchor) frames. A prediction residual is the difference between what was predicted and the original frame. In contrast, a key frame (also called I-frame, intra-coded frame) is compressed without reference to other frames.

If the current frame 805 is a forward-predicted frame, a motion estimator 810 estimates motion of macroblocks or other sets of pixels of the current frame 805 with respect to a reference frame, which is the reconstructed previous frame 825 buffered in a frame store (e.g., frame store 820). If the current frame 805 is a bi-directionally-predicted frame (a B-frame), a motion estimator 810 estimates motion in the current frame 805 with respect to two reconstructed reference frames. Typically, a motion estimator estimates motion in a B-frame with respect to a temporally previous reference frame and a temporally future reference frame. Accordingly, the encoder system 800 can comprise separate stores 820 and 822 for backward and forward reference frames. For more information on bi-directionally predicted frames, see U.S. patent application Ser. No. aa/bbb,ccc, entitled, "Advanced Bi-Directional Predictive Coding of Video Frames," filed concurrently herewith.

The motion estimator 810 can estimate motion by pixel, ½ pixel, ¼ pixel, or other increments, and can switch the resolution of the motion estimation on a frame-by-frame basis or other basis. The resolution of the motion estimation can be the same or different horizontally and vertically. The motion estimator 810 outputs as side information motion information 815 such as motion vectors. A motion compensator 830 applies the motion information 815 to the reconstructed frame(s) 825 to form a motion-compensated current frame 835. The prediction is rarely perfect, however, and the difference between the motion-compensated current frame 835 and the original current frame 805 is the prediction residual 845. Alternatively, a motion estimator and motion compensator apply another type of motion estimation/compensation.

A frequency transformer 860 converts the spatial domain video information into frequency domain (i.e., spectral) data. For block-based video frames, the frequency transformer 860 applies a discrete cosine transform ["DCT"] or variant of DCT to blocks of the pixel data or prediction residual data, producing blocks of DCT coefficients. Alternatively, the frequency transformer 860 applies another conventional frequency transform such as a Fourier transform or uses wavelet or subband analysis. If the encoder uses spatial extrapolation (not shown in FIG. 8) to encode blocks of key frames, the frequency transformer 860 can apply a re-oriented frequency transform such as a skewed DCT to blocks of prediction residuals for the key frame. In some embodiments, the frequency transformer 860 applies an 8×8, 8×4, 4×8, or other size frequency transforms (e.g., DCT) to prediction residuals for predicted frames.

A quantizer 870 then quantizes the blocks of spectral data coefficients. The quantizer applies uniform, scalar quantization to the spectral data with a step-size that varies on a frame-by-frame basis or other basis. Alternatively, the quantizer applies another type of quantization to the spectral data coefficients, for example, a non-uniform, vector, or non-adaptive quantization, or directly quantizes spatial domain data in an encoder system that does not use frequency transformations. In addition to adaptive quantization, the encoder 800 can use frame dropping, adaptive filtering, or other techniques for rate control.

If a given macroblock in a predicted frame has no information of certain types (e.g., no motion information for the macroblock and no residual information), the encoder 800 may encode the macroblock as a skipped macroblock. If so, the encoder signals the skipped macroblock in the output bit stream of compressed video information 895.

When a reconstructed current frame is needed for subsequent motion estimation/compensation, an inverse quantizer 876 performs inverse quantization on the quantized spectral data coefficients. An inverse frequency transformer 866 then performs the inverse of the operations of the frequency transformer 860, producing a reconstructed prediction residual (for a predicted frame) or a reconstructed key frame. If the current frame 805 was a key frame, the reconstructed key frame is taken as the reconstructed current frame (not shown). If the current frame 805 was a predicted frame, the reconstructed prediction residual is added to the motion-compensated current frame 835 to form the reconstructed current frame. A frame store (e.g., frame store 820) buffers the reconstructed current frame for use in predicting another frame. In some embodiments, the encoder applies a deblocking filter to the reconstructed frame to adaptively smooth discontinuities in the blocks of the frame.

The entropy coder 880 compresses the output of the quantizer 870 as well as certain side information (e.g., motion information 815, spatial extrapolation modes, quantization step size). Typical entropy coding techniques include arithmetic coding, differential coding, Huffman coding, run length coding, LZ coding, dictionary coding, and combinations of the above. The entropy coder 880 typically uses different coding techniques for different kinds of information (e.g., DC coefficients, AC coefficients, different kinds of side information), and can choose from among multiple code tables within a particular coding technique.

The entropy coder 880 puts compressed video information 895 in the buffer 890. A buffer level indicator is fed back to bit rate adaptive modules.

The compressed video information 895 is depleted from the buffer 890 at a constant or relatively constant bit rate and stored for subsequent streaming at that bit rate. Therefore, the level of the buffer 890 is primarily a function of the entropy of the filtered, quantized video information, which affects the efficiency of the entropy coding. Alternatively, the encoder system 800 streams compressed video information immediately following compression, and the level of the buffer 890 also depends on the rate at which information is depleted from the buffer 890 for transmission.

Before or after the buffer 890, the compressed video information 895 can be channel coded for transmission over the network. The channel coding can apply error detection and correction data to the compressed video information 895.

B. Video Decoder

FIG. 9 is a block diagram of a general video decoder system 900. The decoder system 900 receives information 995 for a compressed sequence of video frames and produces output including a reconstructed frame 905. Particular embodiments of video decoders typically use a variation or supplemented version of the generalized decoder 900.

The decoder system 900 decompresses predicted frames and key frames. For the sake of presentation, FIG. 9 shows a path for key frames through the decoder system 900 and a path for predicted frames. Many of the components of the decoder system 900 are used for decompressing both key frames and predicted frames. The exact operations performed by those components can vary depending on the type of information being decompressed.

A buffer 990 receives the information 995 for the compressed video sequence and makes the received information available to the entropy decoder 980. The buffer 990 typically receives the information at a rate that is fairly constant over time, and includes a jitter buffer to smooth short-term variations in bandwidth or transmission. The buffer 990 can include a playback buffer and other buffers as well. Alternatively, the buffer 990 receives information at a varying rate. Before or after the buffer 990, the compressed video information can be channel decoded and processed for error detection and correction.

The entropy decoder 980 entropy decodes entropy-coded quantized data as well as entropy-coded side information (e.g., motion information 915, spatial extrapolation modes, quantization step size), typically applying the inverse of the entropy encoding performed in the encoder. Entropy decoding techniques include arithmetic decoding, differential decoding, Huffman decoding, run length decoding, LZ decoding, dictionary decoding, and combinations of the above. The entropy decoder 980 frequently uses different decoding techniques for different kinds of information (e.g., DC coefficients, AC coefficients, different kinds of side information), and can choose from among multiple code tables within a particular decoding technique.

A motion compensator 930 applies motion information 915 to one or more reference frames 925 to form a prediction 935 of the frame 905 being reconstructed. For example, the motion compensator 930 uses a macroblock motion vector to find a macroblock in a reference frame 925. A frame buffer (e.g., frame buffer 920) stores previously reconstructed frames for use as reference frames. Typically, B-frames have more than one reference frame (e.g., a temporally previous reference frame and a temporally future reference frame). Accordingly, the decoder system 900 can comprise separate frame buffers 920 and 922 for backward and forward reference frames.

The motion compensator 930 can compensate for motion at pixel, ½ pixel, ¼ pixel, or other increments, and can switch the resolution of the motion compensation on a frame-by-frame basis or other basis. The resolution of the motion compensation can be the same or different horizontally and vertically. Alternatively, a motion compensator applies another type of motion compensation. The prediction by the motion compensator is rarely perfect, so the decoder 900 also reconstructs prediction residuals.

When the decoder needs a reconstructed frame for subsequent motion compensation, a frame buffer (e.g., frame buffer 920) buffers the reconstructed frame for use in predicting another frame. In some embodiments, the decoder applies a deblocking filter to the reconstructed frame to adaptively smooth discontinuities in the blocks of the frame.

An inverse quantizer 970 inverse quantizes entropy-decoded data. In general, the inverse quantizer applies uniform, scalar inverse quantization to the entropy-decoded data with a step-size that varies on a frame-by-frame basis or other basis. Alternatively, the inverse quantizer applies another type of inverse quantization to the data, for example, a non-uniform, vector, or non-adaptive quantization, or directly inverse quantizes spatial domain data in a decoder system that does not use inverse frequency transformations.

An inverse frequency transformer 960 converts the quantized, frequency domain data into spatial domain video information. For block-based video frames, the inverse frequency transformer 960 applies an inverse DCT ["IDCT"] or variant of IDCT to blocks of the DCT coefficients, producing pixel data or prediction residual data for key frames or predicted frames, respectively. Alternatively, the frequency transformer 960 applies another conventional inverse frequency transform such as a Fourier transform or uses wavelet or subband synthesis. If the decoder uses spatial extrapolation (not shown in FIG. 9) to decode blocks of key frames, the inverse frequency transformer 960 can apply a re-oriented inverse frequency transform such as a skewed IDCT to blocks of prediction residuals for the key frame. In some embodiments, the inverse frequency transformer 960 applies an 8×8, 8×4, 4×8, or other size inverse frequency transforms (e.g., IDCT) to prediction residuals for predicted frames.

When a skipped macroblock is signaled in the bit stream of information 995 for a compressed sequence of video frames, the decoder 900 reconstructs the skipped macroblock without using the information (e.g., motion information and/or residual information) normally included in the bit stream for non-skipped macroblocks.

III. Intelligent Differential Quantization

Figure 10:
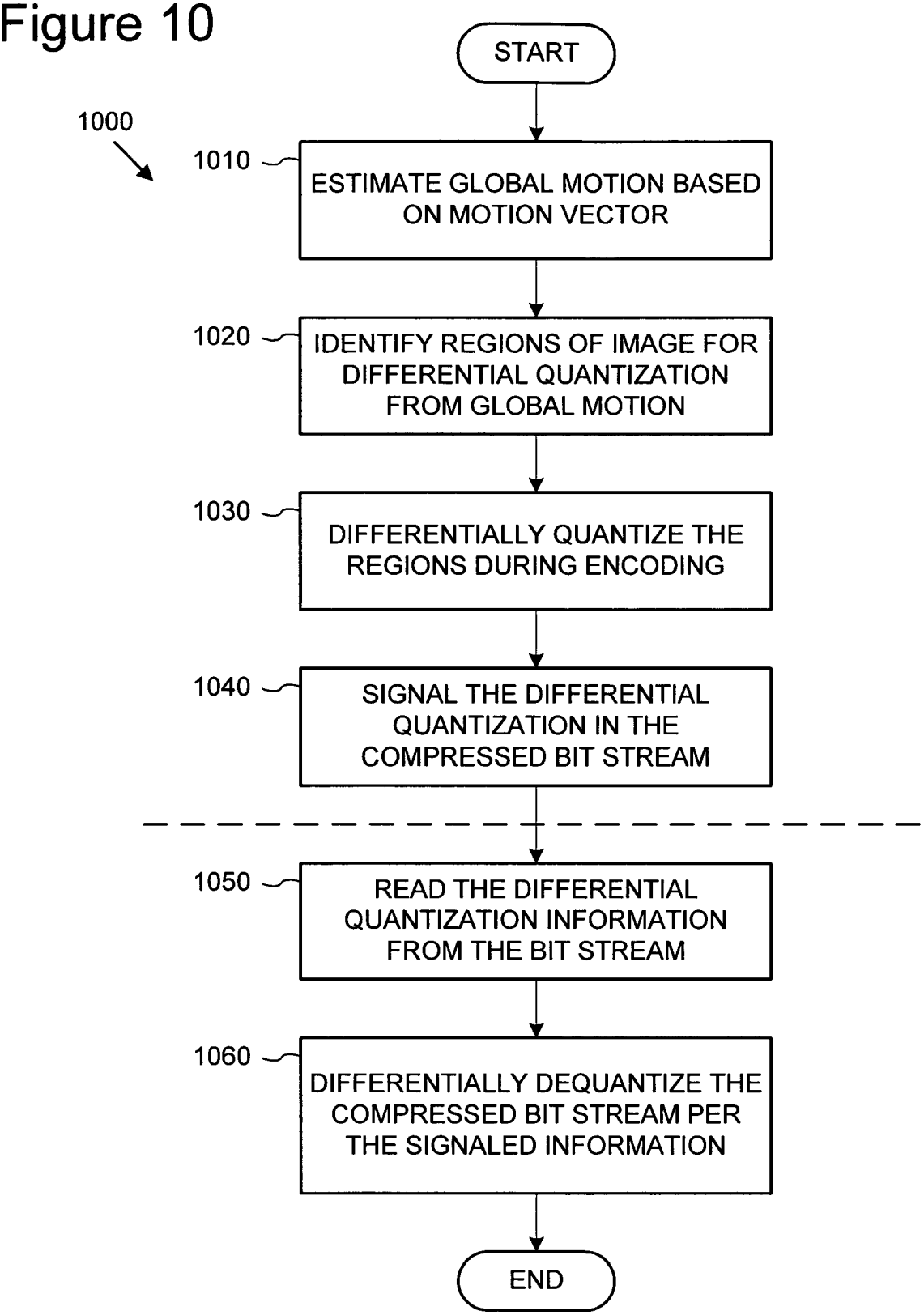
FIG. 10 is a flow chart of an intelligent differential quantization method in the video encoder/decoder system of FIGS. 8-9.

With reference to FIG. 10, the video encoder 800/decoder 900 described above implements intelligent differential quantization techniques in a process 1000 that intelligently quantizes/dequantizes at differing strength levels within a frame, such as on a macroblock (MB) or a group of MB basis. The techniques use the information gathered from encoding and analysis of the video to classify the importance of different regions of the image and quantize/dequantize them accordingly.

More particularly, the video encoder 800/decoder 900 analyzes the global motion of the video to classify the importance of the regions within a frame. As discussed above, the video encoder 800 gathers motion vector information in the encoding process, which is used in encoding the video (e.g., for predictive interframe coding). This motion vector information is encoded as side information in the compressed bit stream. Based on the motion vector information gathered in the encoding process, the video encoder 800/decoder 900 estimates the global motion of the video (at action 1010), including whether the video is panning left/right/up/down/diagonals or zooming in/out.

In one embodiment, the video panning detection can be performed be calculating an aggregate value of the motion vectors within the video frame, and comparing this aggregate value to a motion threshold value. If the aggregate motion vector exceeds the threshold, the video is determined to be panning in the opposite direction. Zoom detection in some embodiments of the invention can be performed by calculating an aggregate of the motion vectors for separate quadrants of the video frame, and testing whether the quadrants' aggregate motion vectors are directed inwardly or outwardly. In alternative embodiments, other methods of video panning and zoom detection based on the motion vectors can be used.

Based on this global motion estimate, the intelligent differential quantization technique then classifies which regions of the video frame may be less important to perceptual quality of the video (action 1020). In particular, if the video is panning toward some direction, the opposite side of the image has less perceptual significance, and can be more coarsely quantized without much impact of overall perceptual quality. For example, if the video is panning towards left, then the right edge of the image will quickly disappear in the following frames. Therefore, the quality of the disappearing edge macroblocks can be compromised (compressed more) to save bits to either meet the bit rate requirement or to improve quality of other part of images without much perceptual degradation. Likewise, if the video is zooming in, the all edges of the image will quickly disappear in the following frames, and the quality of all these disappearing edge macroblocks can be compromised.

According to the intelligent differential quantization technique, the video encoder 800 determines the differential quantization to apply to macroblocks in the frame at action 1030. The regions classified as less perceptually significant are quantized more strongly, which saves bits that can be used to meet bit rate requirements or to decrease the quantization of the macroblocks in regions that are not classified as less perceptually significant.

At action 1040, the video encoder 800 encodes information in the compressed bit stream using a signaling scheme described below for signaling the differential quantization to the video decoder 900. At decoding, the video decoder 900 reads the signaled differential quantization information, and dequantizes the macroblocks accordingly to decompress the video.

A. Differential Quantization Signaling Scheme

Figure 11:
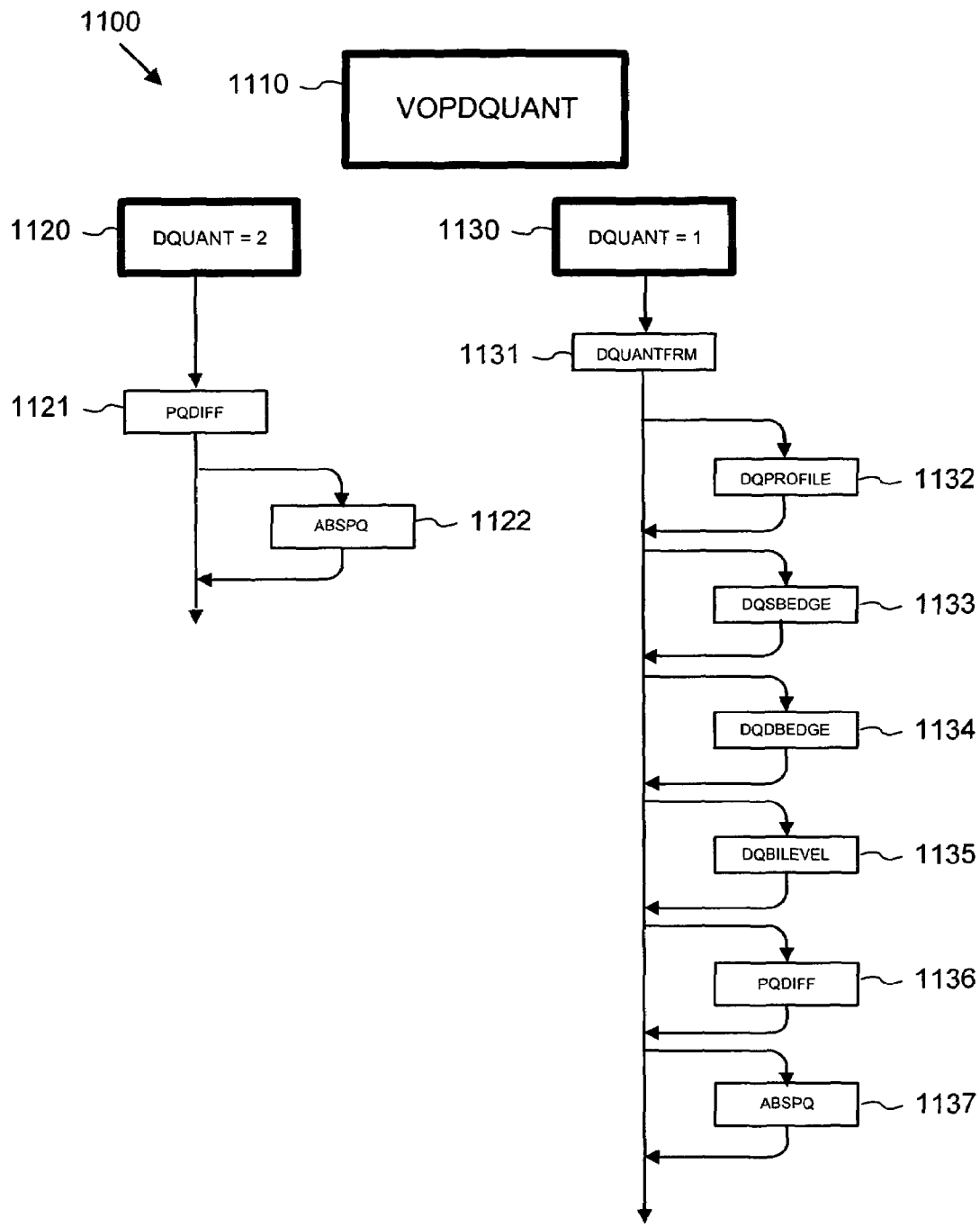
FIG. 11 is a syntax diagram of a syntax for signaling intelligent differential quantization in the video encoder/decoder system of FIGS. 8-9.

With reference to FIG. 11, the video encoder 800 encodes information for signaling the differential quantization that was applied in compressing the video to the video decoder 900. In one embodiment, the video encoder 800 encodes side information in the compressed bit stream using a syntax of the Windows Media Video (WMV) standard. This syntax structure is described in part in the co-filed patent application entitled, "Coding Of Motion Vector Information," which is incorporated herein by reference above; and in the patent application entitled, "Skip Macroblock Coding," filed Dec. 16, 2002, which also is incorporated herein by reference above. In alternative embodiments, the syntax in which the information used in the intelligent differential quantization can be modified for use in another video compression standard or video coding scheme.

FIG. 11 depicts the syntax structure of the side information sent in the compressed bit stream for intelligent differential quantization in this embodiment of the video encoder 800. This side information includes information at the sequence, frame and macroblock levels of the syntax. As further detailed below, the syntax can represent for individual frames in a video sequence, the different quantization applied to macroblocks in respective regions of the frame or to each macroblock individually. The syntax can represent that different quantization levels are applied to macroblocks on each of the frame's boundary edges, to pairs of adjacent boundary edges, to all boundary edges, or all macroblocks individually. This permits the syntax to efficiently signal the various regions identified for differential quantization as being less perceptually significant due to panning and/or zooming.

On sequence header (which is sent per video sequence), this syntax includes a DQUANT flag 1120, which is a 2-bit field that indicates whether or not the quantization step size can vary within a frame. In this syntax, there are three possible values for DQUANT. If DQUANT=0, then only one quantization step size (i.e. the frame quantization step size) is used per frame. If DQUANT=1 or 2, the DQUANT flag indicates the possibility to quantize each macroblock in the frame differently.

On the frame level, a VOPDQUANT field 1110 is made up of several bitstream syntax elements as shown in FIG. 11. The VOPDQUANT field is present in Progressive P picture and Interlace I and P pictures in the sequence, when the sequence header DQUANT field is nonzero. The syntax of the VOPDQUANT field is dependent on the picture type (whether it's an I picture or a P picture) and the value of the DQUANT flag, as follows.

Case 1: DQUANT=1.

In this case, the syntax provides four possibilities:

1. The macroblocks located on the boundary are quantized with a second quantization step size (ALTPQUANT) while the rest of the macroblocks are quantized with the frame quantization step size (PQUANT).
2. The encoder signals two adjacent edges (per Table 1 below) and those macroblocks located on the two edges are quantized with ALTPQUANT while the rest of the macroblocks are quantized with PQUANT.
3. The encoder signals one edge and those macroblock located on the edge are quantized with ALTPQUANT while the rest of the macroblocks are quantized with PQUANT.
4. Every single macroblock can be quantized differently. In this case, we will indicate whether each macroblock can select from two quantization steps (PQUANT or ALTPQUANT) or each macroblock can be arbitrarily quantized using any step size.

Case 2: DQUANT=2.

The macroblocks located on the boundary are quantized with ALTPQUANT while the rest of the macroblocks are quantized with PQUANT.

The bitstream syntax for case 1 includes the following fields:

DQUANTFRM (1 bit)

The DQUANTFRM field 1131 is a 1 bit value that is present only when DQUANT=1. If DQUANT=0 then the current picture is only quantized with PQUANT.

DQPROFILE (2 bits)

The DQPROFILE field 1132 is a 2 bits value that is present only when DQUANT=1 and DQUANTRFM=1. It indicates where we are allowed to change quantization step sizes within the current picture. This field is coded to represent the location of the differentially quantized region as shown in the code Table 1 below.

TABLE 1

Macroblock Quantization Profile (DQPROFILE) Code Table

| FLC | Location |
|---|---|
| 00 | All four Edges |
| 01 | Double Edges |
| 10 | Single Edges |
| 11 | All Macroblocks |

DQSBEDGE (2 bits)

The DQSBEDGE field 1133 is a 2 bits value that is present when DQPROFILE=Single Edge. It indicates which edge will be quantized with ALTQUANT, as shown in the following Table 2.

TABLE 2

Single Boundary Edge Selection (DQSBEDGE) Code Table

| FLC | Boundary Edge |
|---|---|
| 00 | Left |
| 01 | Top |
| 10 | Right |
| 11 | Bottom |

DQDBEDGE (2 bits)

The DQSBEDGE field 1134 is a 2 bits value that is present when DQPROFILE=Double Edge. It indicates which two edges will be quantized with ALTPQUANT, as shown in the following code Table 3.

TABLE 3

Double Boundary Edges Selection (DQDBEDGE) Code Table

| FLC | Boundary Edges |
|---|---|
| 00 | Left and Top |
| 01 | Top and Right |
| 10 | Right and Bottom |
| 11 | Bottom and Left |

DQBILEVEL (1 bit)

The DQBILEVEL field 1135 is a 1 bit value that is present when DQPROFILE=All Macroblock. If DQBILEVEL=1, then each macroblock in the picture can take one of two possible values (PQUANT or ALTPQUANT). If DQBILEVEL=0, then each macroblock in the picture can take on any quantization step size.

PQDIFF (3 bits)

The PQDIFF field 1136 is a 3 bit field that encodes either the PQUANT differential or encodes an escape code.

If the PQDIFF field does not equal 7 then the PQDIFF field encodes the differential and the ABSPQ field does not follow in the bitstream. In this case:

ALTPQUANT=PQUANT+PQDIFF+1

If the PQDIFF field equals 7 then the ABSPQ field follows in the bitstream and the ALTPQUANT value is decoded as:

ALTPQUANT=ABSPQ

ABSPQ (5 bits)

The ABSPQ field 1137 is present in the bitstream if PQDIFF equals 7. In this case, ABSPQ directly encodes the value of ALTPQUANT as described above.

In view of the many possible embodiments to which the principles of our invention may be applied, we claim as our invention all such embodiments as may come within the scope and spirit of the following claims and equivalents thereto.

We claim:

1. A method of differential quantization in video coding of a coded video bit stream, comprising:

analyzing motion vectors of macroblocks for a frame of a video sequence to determine whether global motion of the video at the frame in the video sequence is characteristic of panning or zooming;

classifying regions of the frame according to perceptual significance based on the global motion determination;

differentially quantizing the regions according to their perceptual significance classification in coding a compressed bit stream of the video sequence;

signaling different quantization of the regions in the compressed bit stream, wherein the signaled different quantization includes signaling different quantization strength for macroblocks in a region on at least one boundary edge of the frame, and wherein the signaling uses a syntax that includes coding a choice of the region from among the boundary edges of the frame;

reading the signaled different quantization from the compressed bit stream; and dequantizing, by an inverse quantizer, the macroblocks of the frame according to the signaled different quantization.

2. The method of claim 1 wherein the signaling different quantization uses a syntax that includes coding a frame level quantization strength and an alternative quantization strength coded as a difference from the frame level quantization strength.

3. The method of claim 1 wherein the signaling different quantization uses a syntax that includes coding the region to be any of left, right, top, or bottom boundary edges.

4. The method of claim 1 wherein the signaling different quantization uses a syntax that includes coding the region to be any of adjacent pairs of left, right, top, and bottom boundary edges.

5. The method of claim 1 wherein the signaling different quantization uses a syntax that includes coding the region to be any of a single boundary edge, and a pair of adjacent boundary edges.

6. The method of claim 1 wherein the signaling different quantization uses a syntax that includes coding a choice of the region from among any of a single boundary edge, a pair of adjacent boundary edges, and all four boundary edges.

7. The method of claim 1 wherein the signaling different quantization uses a syntax that includes coding a choice of the region from among any of a single boundary edge, a pair of adjacent boundary edges, all four boundary edges, and all macroblocks individually.

8. A computer-readable storage medium encoded with computer-executable instructions for executing on a computer to perform a method of differential quantization in video coding and decoding of a coded video bit stream, the method comprising:

analyzing motion vectors of macroblocks for a frame of a video sequence to determine whether global motion of the video at the frame in the video sequence is characteristic of panning or zooming;

classifying regions of the frame according to perceptual significance based on the global motion determination;

differentially quantizing the regions according to their perceptual significance classification in coding a compressed bit stream of the video sequence;

signaling different quantization of the regions in the compressed bit stream, wherein the signaled different quantization includes signaling different quantization strength for macroblocks in a region on at least one boundary edge of the frame, and wherein the signaling uses a syntax that includes coding a choice of the region from among the boundary edges of the frame;

reading the signaled different quantization from the compressed bit stream; and dequantizing, by an inverse quantizer, the macroblocks of the frame according to the signaled different quantization.

9. The computer-readable storage medium of claim 8 wherein the signaling different quantization uses a syntax that includes coding a frame level quantization strength and an alternative quantization strength coded as a difference from the frame level quantization strength.

10. The computer-readable storage medium of claim 8 wherein the signaling different quantization uses a syntax that includes coding the region to be any of left, right, top, or bottom boundary edges.

11. The computer-readable storage medium of claim 8 wherein the signaling different quantization uses a syntax that includes coding the region to be any of adjacent pairs of left, right, top, and bottom boundary edges.

12. The computer-readable storage medium of claim 8 wherein the signaling different quantization uses a syntax that includes coding the region to be any of a single boundary edge, and a pair of adjacent boundary edges.

13. The computer-readable storage medium of claim 8 wherein the signaling different quantization uses a syntax that includes coding a choice of the region from among any of a single boundary edge, a pair of adjacent boundary edges, and all four boundary edges.

14. The computer-readable storage medium of claim 8 wherein the signaling different quantization uses a syntax that includes coding a choice of the region from among any of a single boundary edge, a pair of adjacent boundary edges, all four boundary edges, and all macroblocks individually.

\* \* \* \* \*

UNITED STATES PATENT AND TRADEMARK OFFICE
CERTIFICATE OF CORRECTION

PATENT NO. : 7,602,851 B2  Page 1 of 1
APPLICATION NO. : 10/623195
DATED : October 13, 2009
INVENTOR(S) : Lee et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 895 days.

Signed and Sealed this

Fifth Day of October, 2010

David J. Kappos
*Director of the United States Patent and Trademark Office*